(12) United States Patent
Beria et al.

(10) Patent No.: US 10,681,172 B2
(45) Date of Patent: Jun. 9, 2020

(54) SECURE DATA SHARING THROUGH A NETWORK APPLICATION

(71) Applicant: SAP SE, Walldorf (DE)

(72) Inventors: Yogesh Beria, Purulia (IN); Arun Govind, Bangalore (IN); Srikanth Grandhe, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/612,218

(22) Filed: Jun. 2, 2017

(65) Prior Publication Data

US 2018/0270322 A1 Sep. 20, 2018

Related U.S. Application Data

(60) Provisional application No. 62/471,463, filed on Mar. 15, 2017.

(51) Int. Cl.
*H04L 29/08* (2006.01)
*G06F 3/14* (2006.01)
*G06F 16/245* (2019.01)

(52) U.S. Cl.
CPC ............ *H04L 67/32* (2013.01); *G06F 3/1454* (2013.01); *G06F 16/245* (2019.01); *H04L 67/10* (2013.01)

(58) Field of Classification Search
CPC ........ H04L 67/32; H04L 67/10; G06F 3/1454
See application file for complete search history.

(56) References Cited

U.S. PATENT DOCUMENTS

| 2002/0123864 A1* | 9/2002 | Eryurek | G05B 23/0254 |
| | | | 702/188 |
| 2009/0089709 A1* | 4/2009 | Baier | G05B 19/409 |
| | | | 715/817 |

(Continued)

OTHER PUBLICATIONS

"Communication: European Extended Search Report", dated Apr. 3, 2018, European Patent Office, European Application No. 17002063.0-1222, 7pgs.

(Continued)

*Primary Examiner* — Nicholas R Taylor
*Assistant Examiner* — Sanjoy Roy
(74) *Attorney, Agent, or Firm* — Buckley, Maschoff & Talwalkar LLC (57) ABSTRACT

Some embodiments include reception, from a first client system, of first instance data of a first data structure defined by the stored metadata, the first instance data associated with a first entity, storage of the first instance data of the first data structure in a data store, reception, from the first client system, of an indication associating the first instance data, a second client system, and second data not defined by the metadata, storage of the indication in the data store, reception, from the first client system, of information for retrieving the second data from the first client system and for generating a visualization based on the second data, reception of a request for data associated with the first entity from a second client system, and, in response to the request, identification of the stored indication associating the first instance data, the second client system, and the second data, retrieval of the second data from the first client system based on the information, generation of the visualization of the second data based on the information, and transmission of a visualization of the stored first instance data and the visualization of the second data to the second client system.

19 Claims, 11 Drawing Sheets

(56) References Cited

U.S. PATENT DOCUMENTS

| | | | | |
|---|---|---|---|---|
| 2011/0209045 | A1* | 8/2011 | Ghosh | G06Q 10/06 |
| | | | | 715/234 |
| 2013/0173539 | A1* | 7/2013 | Gilder | G06F 17/30578 |
| | | | | 707/622 |
| 2015/0220583 | A1* | 8/2015 | Teletia | G06F 16/2272 |
| | | | | 707/696 |
| 2015/0281355 | A1* | 10/2015 | Maturana | H04L 67/1097 |
| | | | | 709/202 |
| 2016/0203150 | A1* | 7/2016 | Alten | G06F 16/16 |
| | | | | 707/714 |

OTHER PUBLICATIONS

Abdulezer, Loren and Susan et al., "Skype for Dummies", Dec. 31, 2007 (Dec. 31, 2007), XP055460551, Retrieved from the Internet: URL:https://ixn.es/Skype%20For%20Dummies.pdf, [retrieved on Mar. 19, 2018], 362pgs.

"Summons to Attend Oral Proceedings pursuant to Rule 115(1) EPC", Issued in European Patent Application No. 1700063.0, dated Feb. 21, 2020 (Feb. 21, 2020), 7 pgs.

"Web service", Mar. 2, 2017 (Mar. 2, 2017), XP055662246, Retrieved from the Internet: URL:https:/en.wikipedia.org/w/index.php?title=Web_service&oldid=768189003 [retrieved on Jan. 27, 2020], 6pgs.

\* cited by examiner

SECURE DATA SHARING THROUGH A NETWORK APPLICATION

CROSS-REFERENCE TO RELATED APPLICATIONS

This application is related to, and claims benefit of and priority to, U.S. Provisional Patent Application No. 62/471,463, filed Mar. 15, 2017, the contents of which are hereby incorporated by reference in their entirety for all purposes.

BACKGROUND

Figure 1:
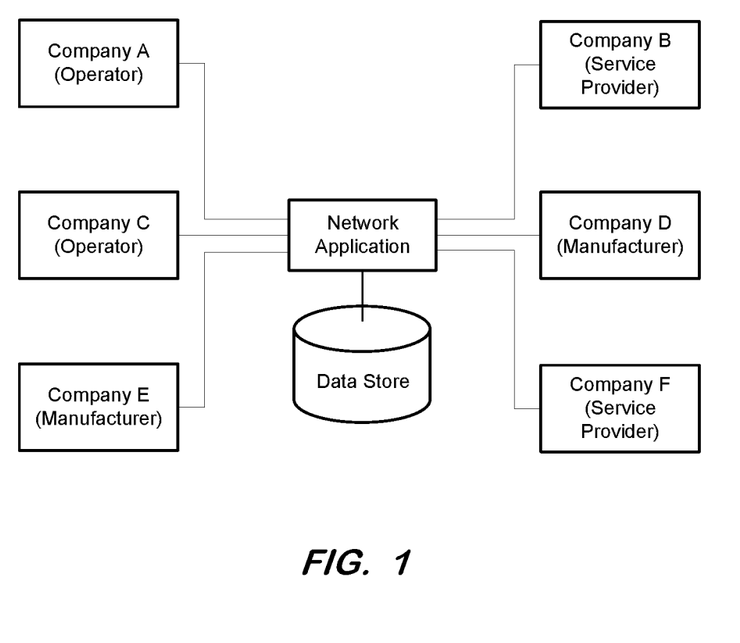
FIG. 1 is a block diagram of a network application architecture.

FIG. 1 shows Company A and Company B connected to a network application. For example, Company A is the operator of a thermal power plant and Company B is a service provider providing maintenance services to equipment used by Company A. The network application allows Company A and Company B to share equipment information, which benefits both parties and facilitates collaboration therebetween. Similarly, a manufacturer such as Company D may share equipment information with both Company A and Company B, as well as with other operators and service providers.

This above-mentioned sharing is limited to content conforming to a data model/template provided by the network application. Company A may operate a private resource planning system which stores equipment work list information and notifications, and another private system which stores real time temperature sensor information. Company A cannot share this data with Company B through the network application if this type of data is not defined/supported by the data model/template of by the network application. Moreover, Company B does not have access to Company A's private systems so the information cannot be shared via a direct network connection. Although the information may be shared through alternative electronic means (e.g., an email), these alternatives fail to support the information with the useful information context provided by the network application.

Additionally, the information might not be particularly useful to Company B unless it is visualized in a certain way. For example, sensor information may be visualized over time with thresholds and in comparison with normal behavior to detect abnormalities. It would be advantageous to share, via a secure network application, data which doesn't conform to a network application data model in a context-specific manner which supports appropriate visualization of such data through the network application.

DETAILED DESCRIPTION

The following description is provided to enable any person in the art to make and use the described embodiments. Various modifications, however, will remain apparent to those in the art.

Figure 2:
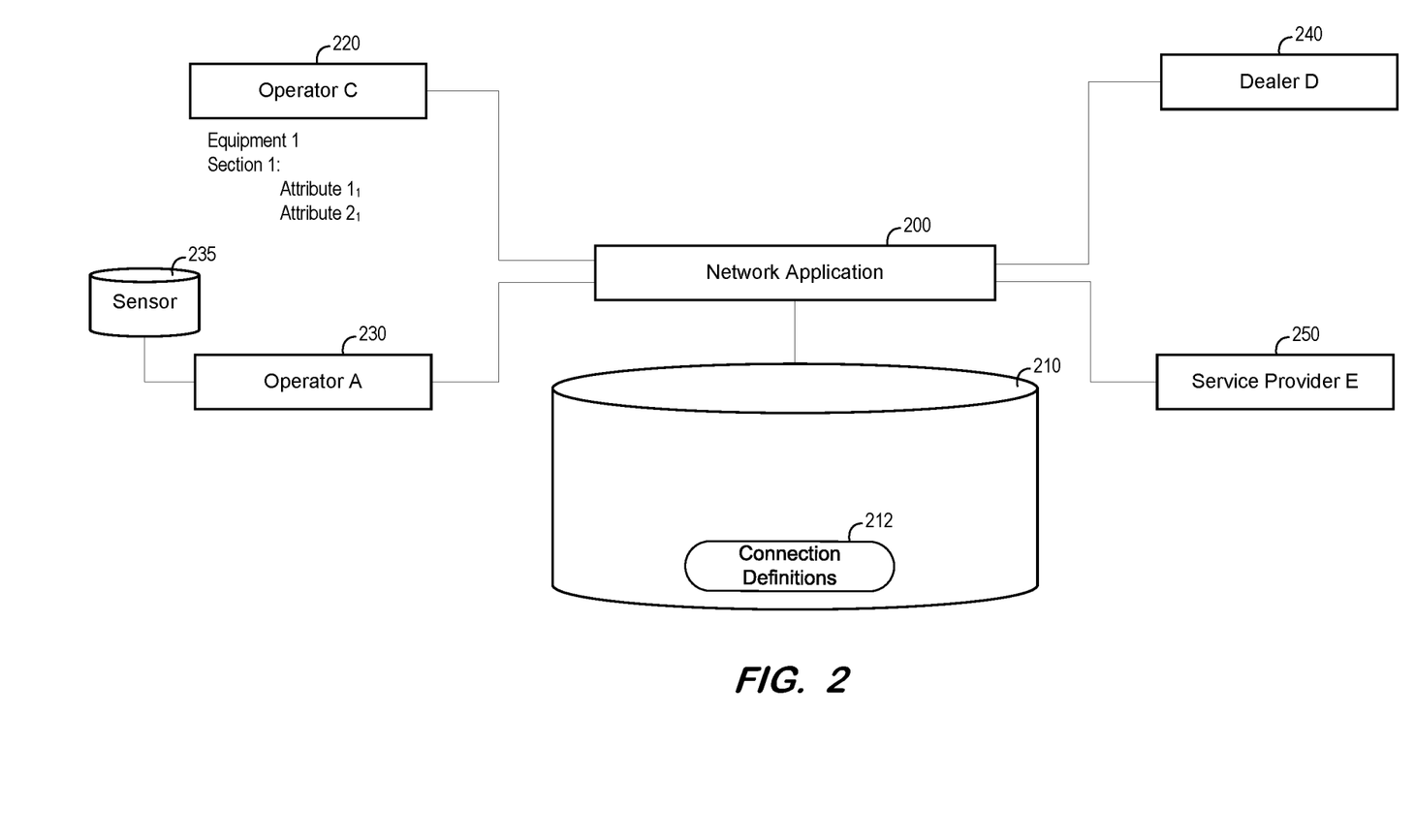
FIG. 2 is a block diagram of a system according to some embodiments.

Generally, some embodiments facilitate the sharing of information and its visualization in a context-specific manner through a secure network application. FIG. 2 illustrates the architecture of a network application according to some embodiments.

FIG. 2 includes network application 200, data store 210, and client systems 220, 230, 240 and 250. Network application 200 may comprise a software application executed by a server (e.g., a cloud-based Web server) to share information among client systems. For example, network application 200 may support the establishment of logical connections between various client systems and the sharing of data therebetween based on those logical connections.

Data store 210 may store data received from one or more of client systems 220, 230, 240 and 250. The data may conform to a data schema defined by metadata also stored in data store 210. The data may be shared amongst client systems based on connection definitions 212 stored in data store 210. Connection definitions 212 may specify logical connections between various sets of client systems and network application 200 may operate to allow the sharing of data only between client systems which are logically connected per connection definitions 212.

Connection definitions 212 may exhibit any degree of granularity. For example, connection definitions 212 may specify that data received from client system 220 may be shared with client system 240, but that data received from client system 240 may not be shared with client system 230. Moreover, connection definitions 212 may specify that certain types of data received from client system 230 may be shared with client system 250, while other types of data received from client system 230 may only be shared with client system 240. The granularity specified in connection definitions 212 may also consider the role of the client system user who requests the data.

Data store 210 may comprise any type of data storage device (e.g., one or more hard disk drives, volatile random access memory, non-volatile random access memory) storing any type of data sources which are or become known, including but not limited to database views, spreadsheets, relational databases and/or OnLine Analytical Processing cubes. Data store 210 may also comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 210 may be distributed among several relational databases, dimensional databases, and/or other data sources. Embodiments are not limited to any number or types of data sources.

In some embodiments, the data stored in data store 210 may comprise one or more of conventional tabular data, row-based data, column-based data, and object-based data. Moreover, the data may be indexed and/or selectively replicated in an index to allow fast searching and retrieval thereof. Data store 210 may support multi-tenancy to separately support multiple unrelated clients by providing multiple logical database systems which are programmatically isolated from one another.

Data store 210 may implement an "in-memory" database, in which a full database stored in volatile memory. The full database may be persisted in and/or backed up to fixed disks. Embodiments are not limited to an in-memory implementation. For example, recently-used data may be stored in random access cache memory and the full database may be stored in persistent storage.

Each of client systems 220, 230, 240 and 250 may comprise any computing system having any architecture, including distributed architectures, which are or become known. According to some embodiments, a client system executes a Web browser to present a user interface to a user on a display, and the user manipulates the user interface to upload or to request information to/from network application 200. The client system then issues corresponding calls to network application 200 using Web protocols.

Each component of FIG. 2 may comprise various hardware elements to execute program code to perform the processes ascribed to herein. All processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Continuing with the example of FIG. 2, it is assumed that network application 200 operates based on metadata defining a particular type of equipment using two attributes: Attribute 1 and Attribute 2. Client system 220 (i.e., Operator C) defines an instance Equipment 1 of the particular equipment type including respective attribute values Attribute $1_1$ and Attribute $2_1$.

It will now be assumed that this instance data is uploaded to network application 200. The upload may be manually-triggered as described above, a scheduled operation, or responsive to the upload of new instance data to client system 220. The upload may include uploading of other instance data of client system 220.

Figure 3:
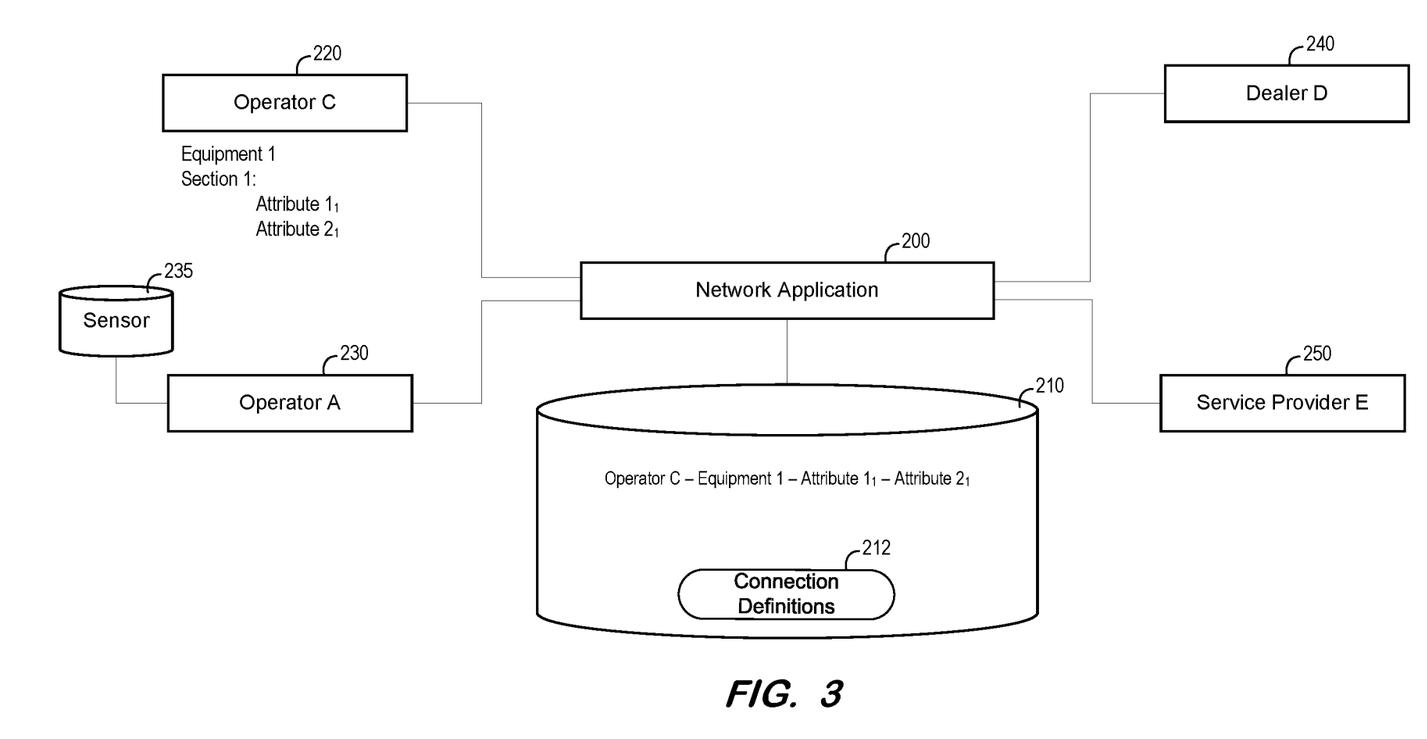
FIG. 3 is a block diagram of a system according to some embodiments.
Figure 4:
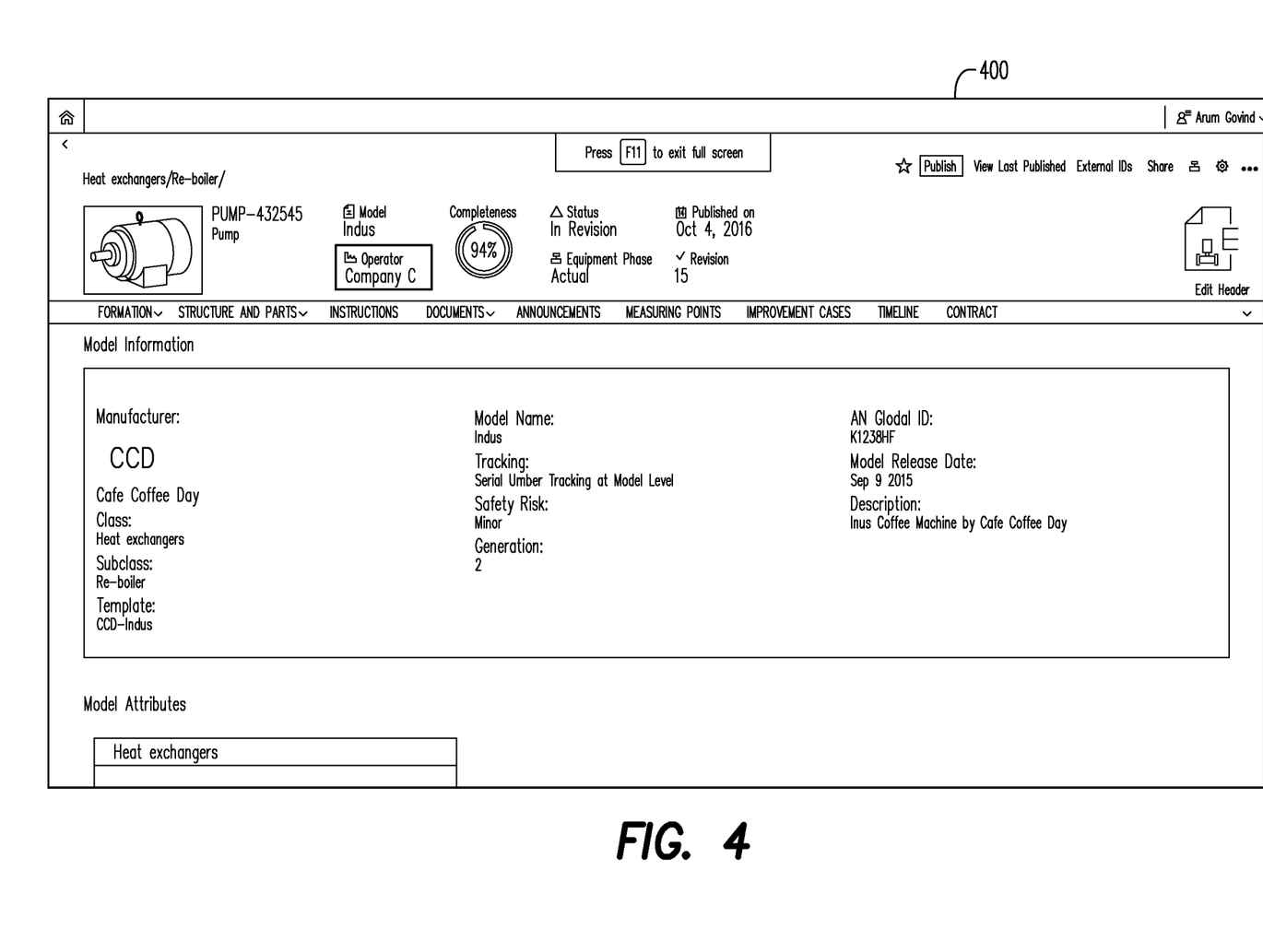
FIG. 4 is an outward view of a user interface according to some embodiments.

In response to the upload of the instance data, network application 200 stores the data in a table record of the data store 210 as shown in FIG. 3. It will also be assumed that connection definitions 212 specify a data sharing relationship between Operator C and client system 240 (i.e., Dealer D). Accordingly, Dealer D may access network application 200 to view the instance data (e.g., Attribute $1_1$ and Attribute $2_1$) for Equipment 1 of Operator C. FIG. 4 illustrates user interface 400 presented to Dealer D, for example, upon accessing network application 200 and the record for Equipment 1 of Operator C.

It may also be assumed that connection definitions 212 specify a data sharing relationship between Operator C and client system 250 (i.e., Service Provider E). Service Provider E may similarly access network application 200 to view the instance data (e.g., Attribute $1_1$ and Attribute $2_1$) for Equipment 1 of Operator C. User interface 400 of FIG. 4 may also be presented to Service Provider E in response to such access.

Figure 5:
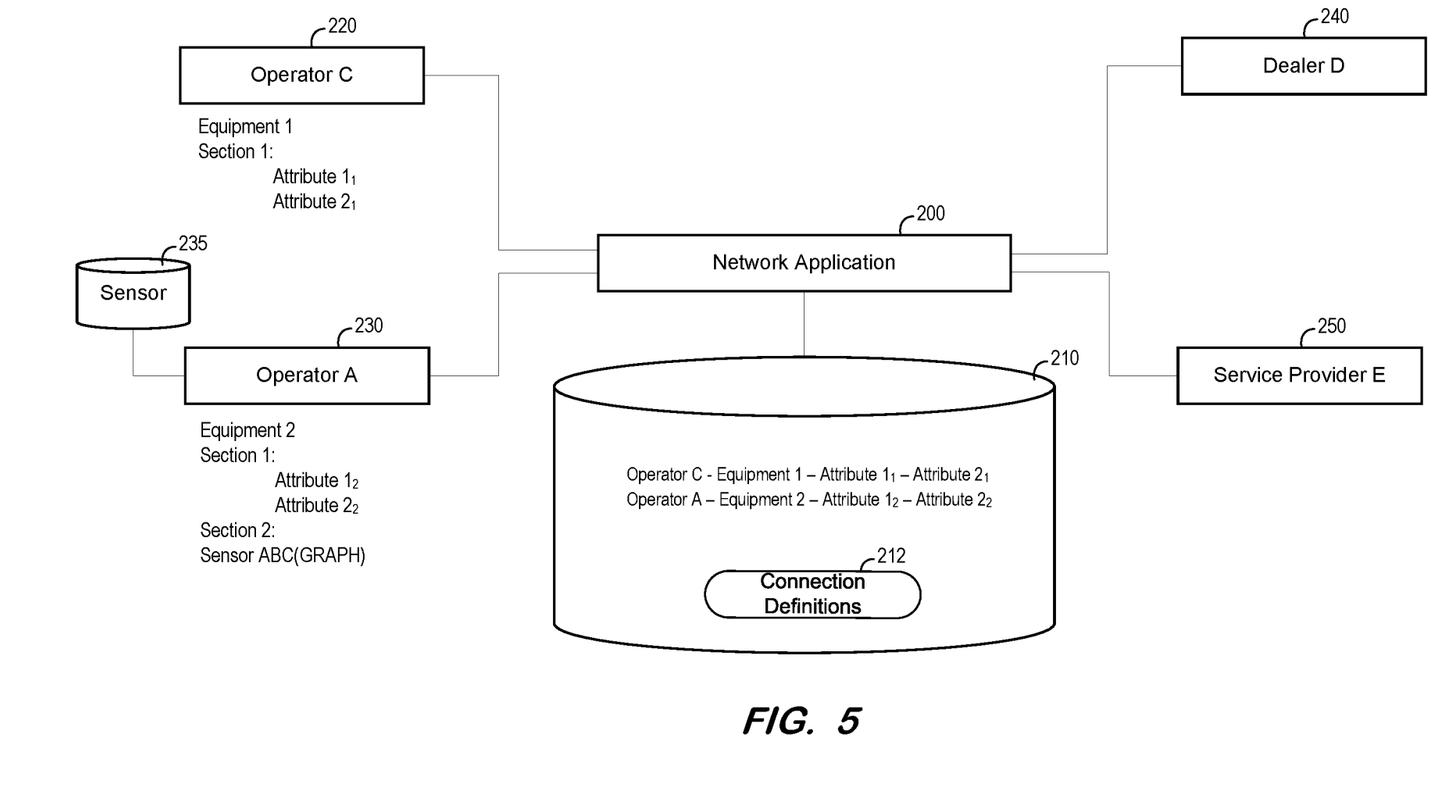
FIG. 5 is a block diagram of a system according to some embodiments.

As shown in FIG. 5, client system 230 (i.e., Operator A) may also define an instance Equipment 2 of the same equipment type including respective attribute values Attribute $1_2$ and Attribute $2_2$. This instance data may be uploaded to network application 200 as described above and stored in a table record (e.g., as "Operator A—Equipment 1—Attribute $1_2$—Attribute $2_2$") of data store 210. According to some embodiments, the data of the table record may be shared with "authorized" client systems as described above with respect to the data uploaded by client system 220.

As also shown in FIG. 5, client system 230 also stores data generated by sensor 235. This sensor data may be associated with the instance Equipment 2, and client system 230 may store the sensor data in association with the instance Equipment 2 in its respective data store. The sensor data is not modeled by the metadata of network application 200 which defines the particular equipment type (i.e., Equipment—Attribute 1—Attribute 2). In prior systems, even if the sensor data could be stored by network application 200, network application 200 would not know the semantics of this data and would therefore be unable to present the data to a requesting client system in a semantically-meaningful manner.

Figure 6:
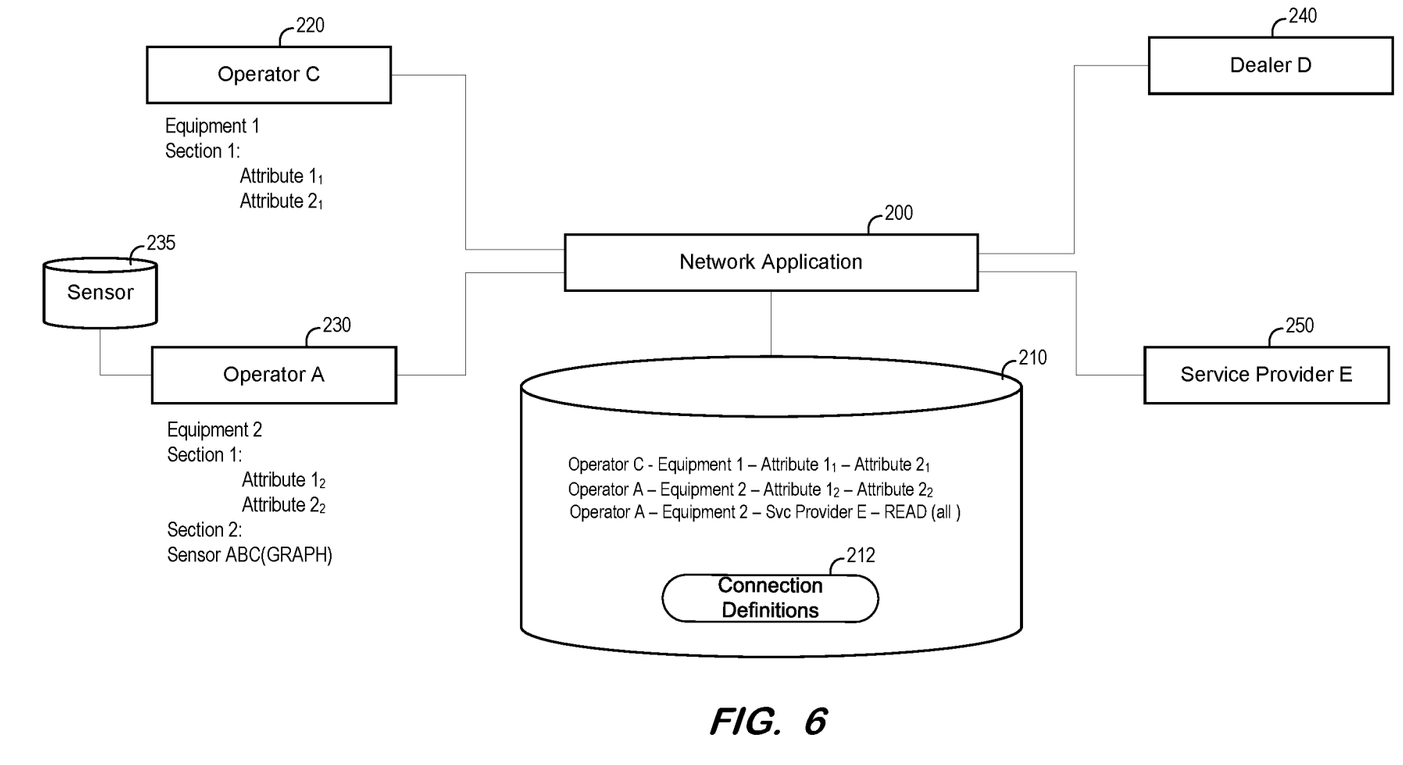
FIG. 6 is a block diagram of a system according to some embodiments.

According to some embodiments, client system 230 indicates the existence of the additional data to network application 200. The indication may specify other client systems which are permitted to access the additional data, and a type of access. As illustrated in FIG. 6, network application 200 generates a new record which associates this data with client system 230 (e.g., Operator A—Equipment 2—Service Provider E—READ (all)).

Figure 7:
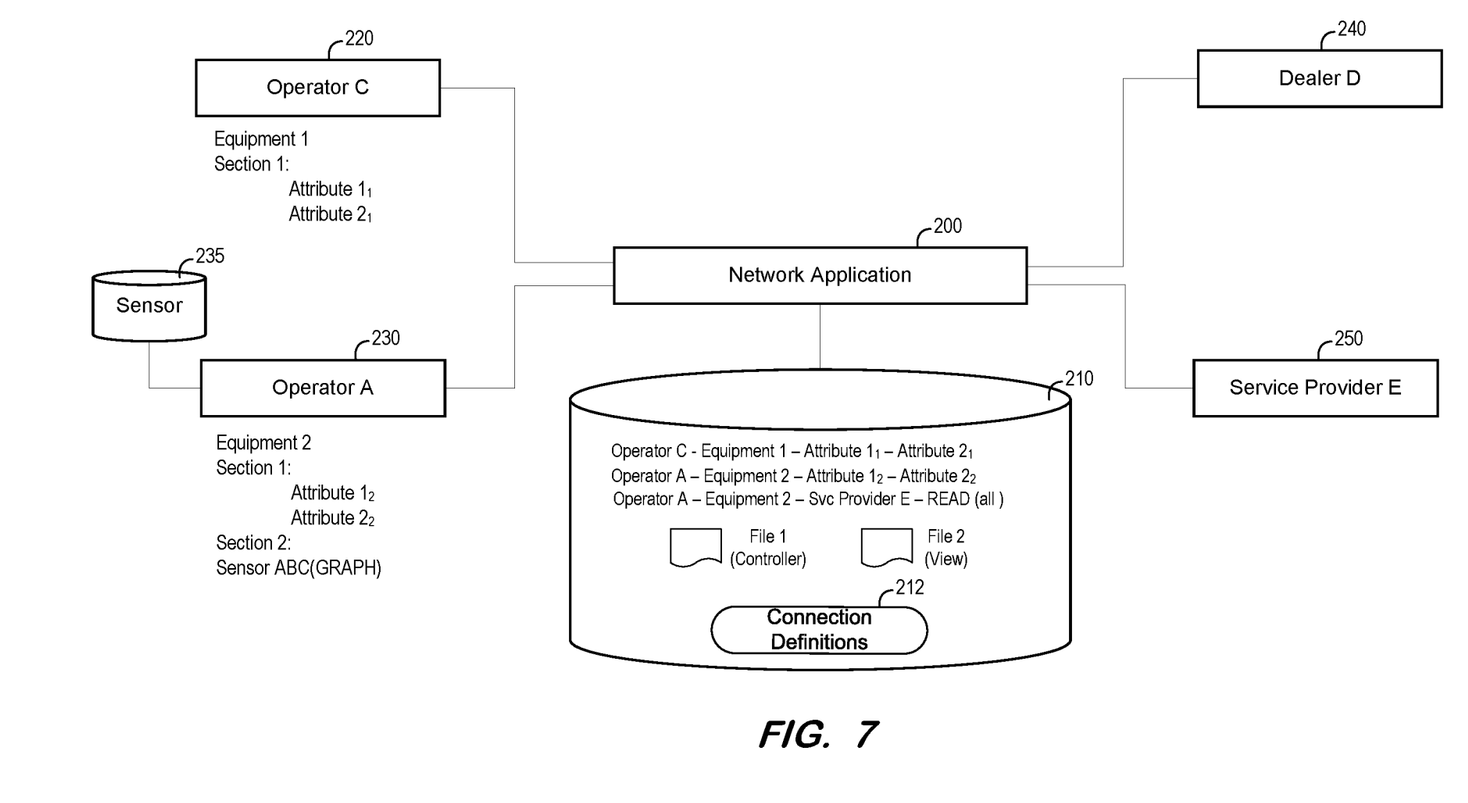
FIG. 7 is a block diagram of a system according to some embodiments.

In order to further support the sharing of the non-modeled data (i.e., non-modeled by network application 200), client system 230 also uploads a controller file and a view file, which may be stored in a document repository of data store 210. FIG. 7 illustrates storage of controller file 1 and view file 2 in data store 210 according to some embodiments. Controller file 1 provides information which network application 200 may use to access the sensor data directly from client system 230, for example via a trusted content integrator (not shown). View file 2 provides formatting information which network application 200 may use to format the sensor data for presentation, in a proper context, to an authorized viewer (e.g., Service Provider E). Accordingly, some embodiments allow network application 200 to provide the data in a secure manner and in a suitable format even if network application 200 has no knowledge of the structure or semantic meaning of the data.

According to conventional Model-View-Controller architecture, a view file is an output representation of the information, such as a chart, diagram or a table. The file is implemented according to the rules/conventions provided by the particular framework being used by network application 200. A controller file is used to implement logic associated with the view. The controller file includes code to handle user interactions, to receive and send data, to format the data for visualization and any other additional code to support the execution of the visualization. The controller file is also implemented according to the rules/conventions provided by the framework being used by network application 200.

After the controller and view files are uploaded, they are checked for syntax, malware/malicious code, and or objectionable content, and to ensure they conform to the semantics required by network application 200. In some embodiments, the controller file does not include code which causes cross-site scripting, cross-origin issues, semantical or other security issues and/or code which might disrupt the standard functionality or cause errors in the standard code.

Figure 8:
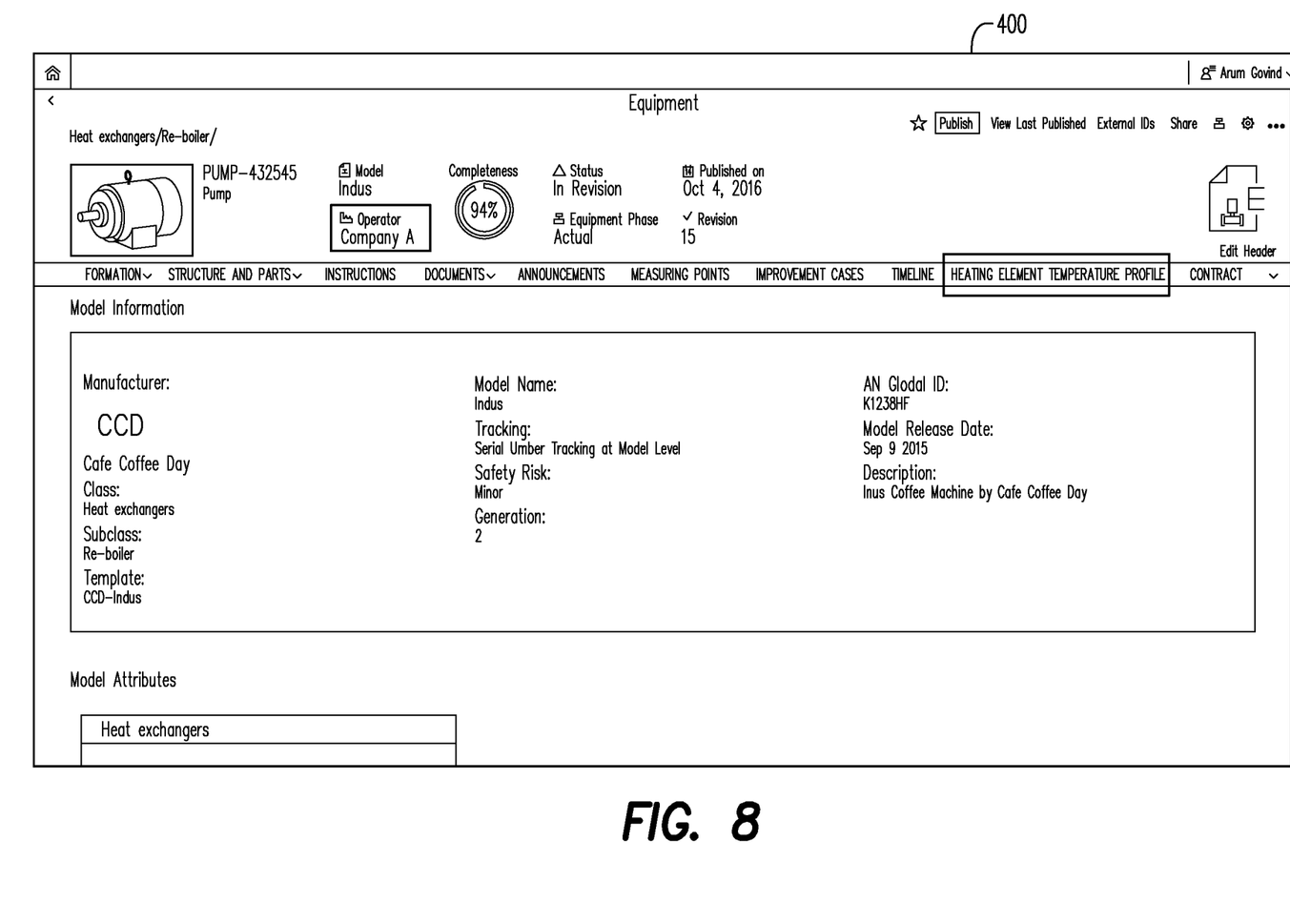
FIG. 8 is an outward view of a user interface according to some embodiments.

FIG. 8 illustrates user interface 800 presented to Service Provider E, for example, upon accessing network application 200 and the record for Equipment 2 of Operator A. Interface 800 presents the same information as interface 400 of FIG. 4, however, in response to the request for the record, network application 200 identifies the stored record of data store which indicates the sharing of additional data with respect to Operator A, Equipment 2 and Service Provider E. Accordingly, user interface 800 includes a new tab "Heating Element Temperature Profile" which is not present in the user interface of FIG. 4. The stored record may include the data used to populate the new tab.

If the user at Service Provider E selects the "Heating Element Temperature Profile" tab, network application 210 uses the data of associated Controller file 1 to access and retrieve the sensor data (i.e., Sensor ABC(GRAPH)) directly from Operator A's system. In some embodiments, this data is retrieved in response to Service Provider E's original request for the record for Equipment 2 of Operator A. In the latter case, the retrieved data may include the data used to populate the new tab.

According to some embodiments, the retrieved sensor data may reflect the following format:

```
[
  {
    "temperatureValue": "61",
    "timestamp": "2016-11-08T09:00:00Z"
  },
  {
    "temperatureValue": "63",
    "timestamp": "2016-11-08T09:03:00Z"
  },
  {
    "temperatureValue": "64",
    "timestamp": "2016-11-08T09:04:00Z"
  },
  {
    "temperatureValue": "67",
    "timestamp": "2016-11-08T09:06:00Z"
  },
  {
    "temperatureValue": "67",
    "timestamp": "2016-11-08T09:07:00Z"
  },
  {
    "temperatureValue": "70",
    "timestamp": "2016-11-08T09:10:00Z"
  }
]
```

After retrieving the sensor data, network application 210 uses View file 2 from data store 210 to generate a visualization based on the received sensor data. In the present example, this visualization may be added to user interface 800 under the "Heating Element Temperature Profile" tab. Selection of the tab results in display of the visualization as shown in FIG. 9.

Figure 9:
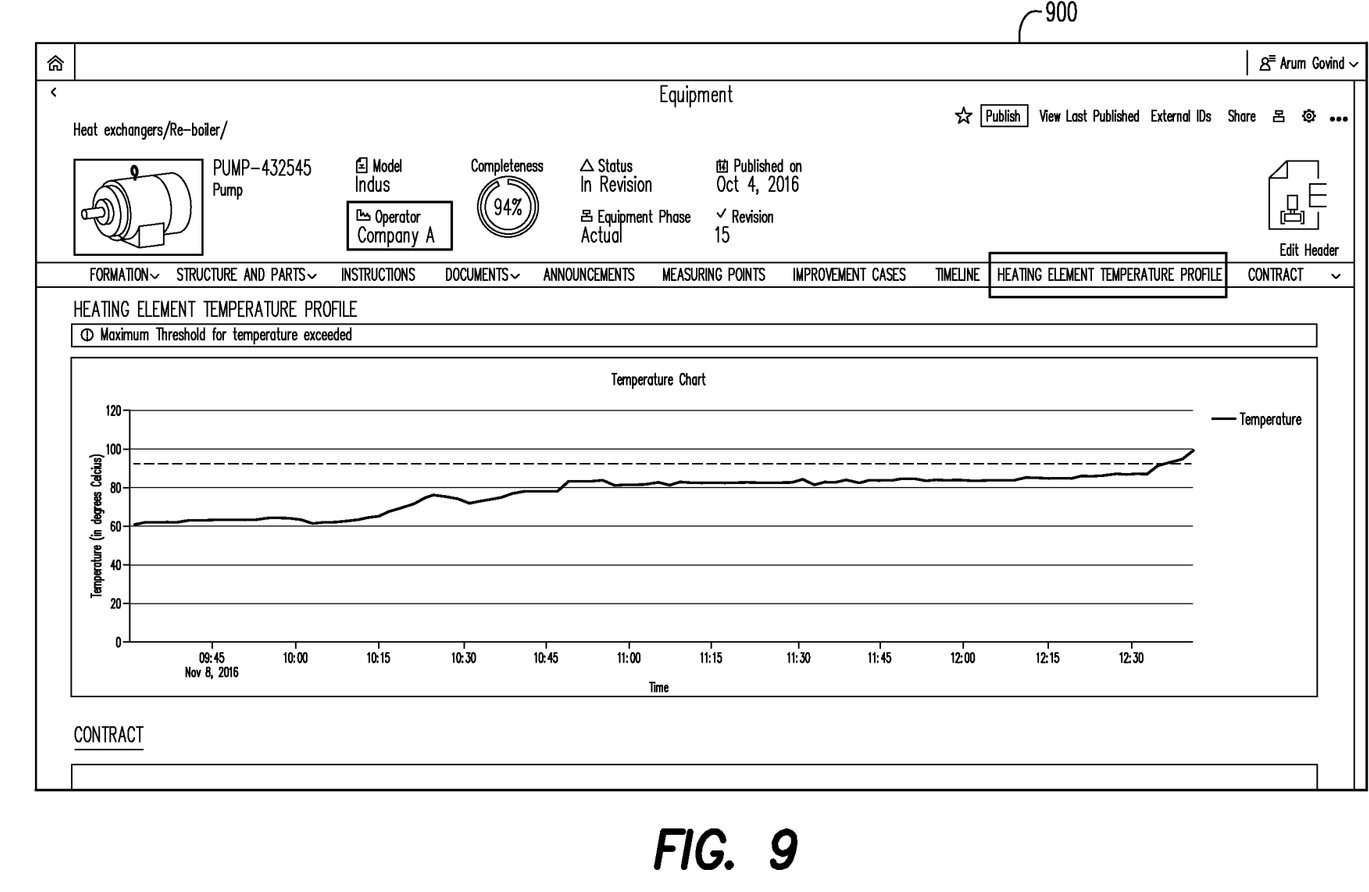
FIG. 9 is an outward view of a user interface according to some embodiments.

In contrast to FIGS. 8 and 9, if Dealer D were to access of the record for Equipment 2 of Operator A, Dealer D would be presented with an interface similar to interface 400 of FIG. 4, which shows only the uploaded data which conforms to the data model of network application 200. In particular, such an interface would not include a "Heating Element Temperature Profile" tab, according to some embodiments.

Accordingly, neither network application 200 nor the receiving client system requires knowledge of the format or semantics of the non-conforming data, and are yet able to display and view the data in a meaningful way in the context provided by network application 200. Moreover, the client system which shares the data has control over what data is shared and how the data are visualized.

Information sharing according to some embodiments is not limited to any number or type of connected entities. For example, an operator company may share private (i.e., non-network) information with a service provider, a manufacturer, and a dealer. Similarly, multiple connected entities could privately share information with each other (e.g., a service provider could receive information from multiple operator companies) in the same context in which all other related information is being shared.

In some embodiments, the entity receiving the information is not required to perform any dedicated configuration or other steps. A receiving entity may choose to not view any additional (i.e., non-conforming) shared information and to view only the standard available information.

Some embodiments may advantageously avoid a need for credential sharing, since the authentication with the sharing client system is handled centrally by network application 200. Since no dedicated credential maintenance is required at the client system level for sharing of the non-network information, the overhead of creating and maintain additional credentials is reduced.

Figure 10:
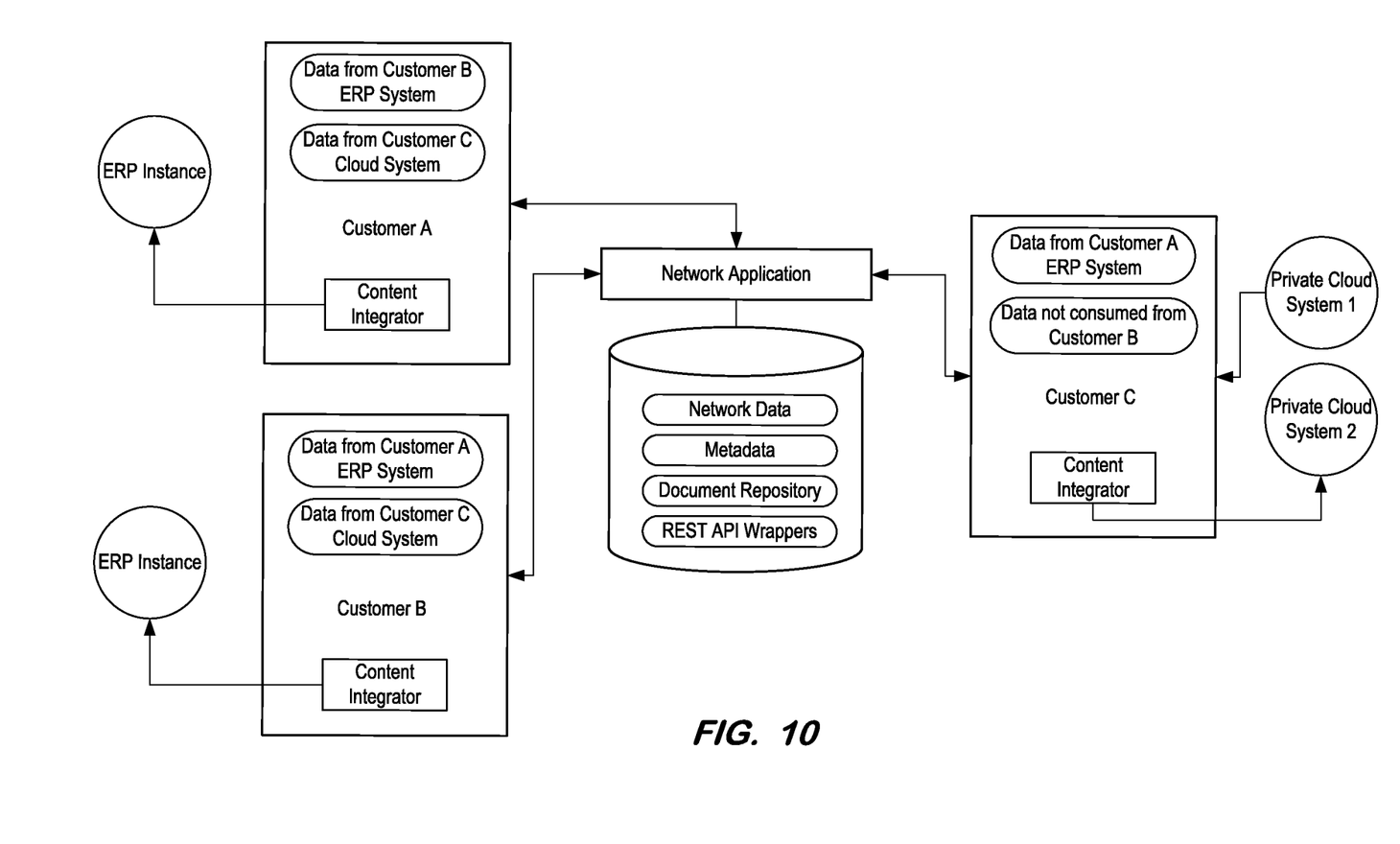
FIG. 10 is a block diagram of a system according to some embodiments.

FIG. 10 illustrates three customer companies connected through a network application according to some embodiments. The network application is cloud-based and connects Customer A, Customer B and Customer C. Customer A operates an enterprise resource planning system of a first vendor, while Customer B operates an enterprise resource planning system of a second vendor. Customer C operates two cloud systems. All Customers may or may not operate a content integrator system.

The network application of FIG. 10 includes a document repository and exposed API wrapper services which can accept GET, PUT, POST, DELETE method types. The API wrappers acts as proxies between the four customer systems in order to avoid cross-origin issues.

In one example, Customer A would like to share the information stored in its ERP system with Customer B and Customer C. Also, this data is desired to be context-specific and visualized in a certain way so that it is useful for the customer which is consuming the content.

Customer A creates the aforementioned View and Controller files (e.g., based on a Model-View-Controller architecture) required to retrieve and visualize the information and uploads the files to the network application. A service call to fetch the data is constructed based on the Controller file and by wrapping the calls using the standard REST API services provided by the network application. When another customer desires to consume and view the data, the network application identifies the context and serves the data accordingly as described above.

Similarly, Customers B and C may also share their data from the private systems. Company C may choose not to view the data from Company B as described above.

Figure 11:
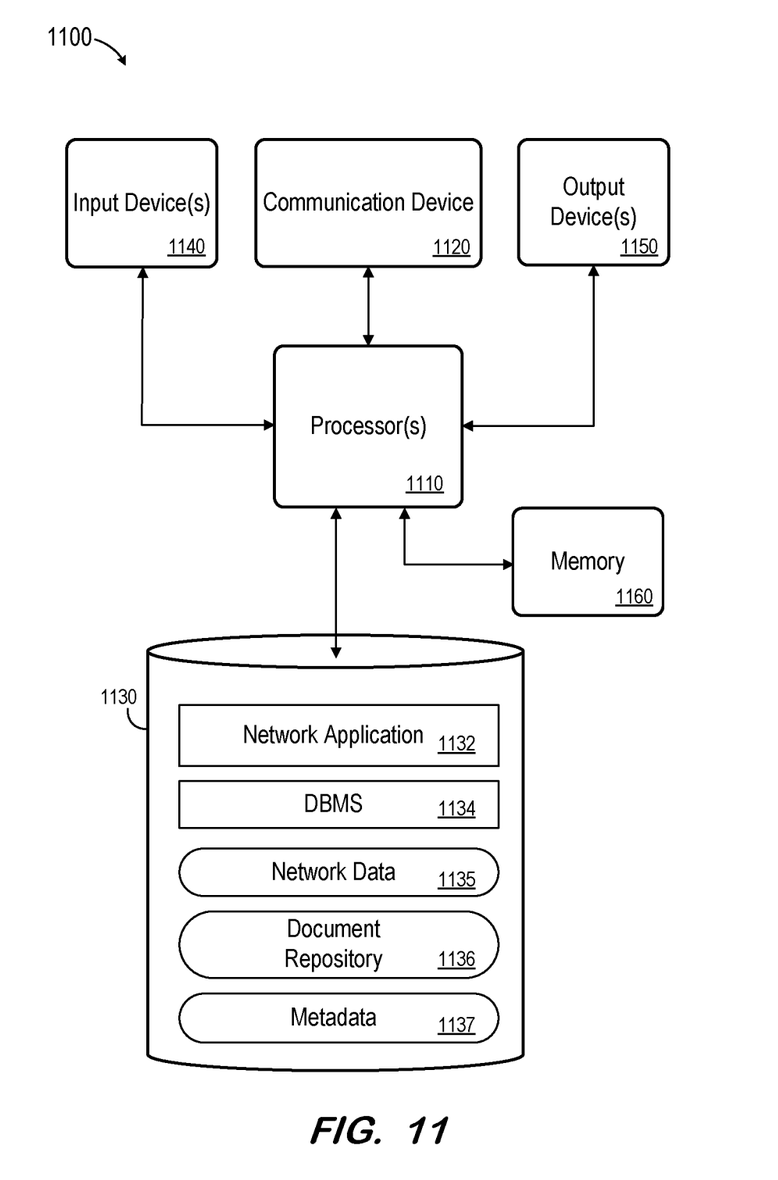
FIG. 11 is a block diagram of an apparatus according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of a network application as described herein. Apparatus 1100 may include other unshown elements according to some embodiments.

Apparatus 1100 includes processor(s) 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM), Storage Class Memory (SCM) or any other fast-access memory.

Network application 1132 and DBMS 1134 may comprise program code executed by processor 1110 to cause apparatus 1100 to perform any one or more of the processes described herein. Embodiments are not limited to execution of these processes by a single apparatus.

Network data 1135, document repository 1136 and metadata 1137 of device 1130 (either cached or a full database) may also be stored in volatile memory such as memory 1160. Network data 1135 may comprise data to be shared among networked systems, as well as connection definitions which define each system's access to the shared data. Document repository 1136 may include the above-mentioned controller and view files for each type of non-conforming shared data. In this regard, each networked system may upload a controller file and a view file for each type of non-conforming data it wishes to share.

Metadata 1137 may include information regarding the structure of the data stored within data 1135. Data storage device 1130 may also store data and other program code for providing additional functionality and/or which are necessary for operation of apparatus 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a storage system storing:
     metadata defining a plurality of data structures; and
     one or more processing units to execute program code to cause the system to:
       receive, from a first client system, first instance data of a first data structure defined by the metadata;
       store the first instance data of the first data structure in the storage system;
       receive, from the first client system, an indication associating the first instance data and a second client system with an identification of an existence of unmodeled second data without including the unmodeled second data, wherein the second client system is authorized to access the unmodeled second data based on the indication, and wherein the unmodeled second data is associated with the first instance data but is not defined by the metadata that defines the first data structure, wherein the identification of the existence of the unmodeled second data in the indication is distinct from the unmodeled second data;
       store the indication in the storage system; and
       receive, from the first client system, information for retrieving the unmodeled second data from the first client system and for generating a visualization for presentation of the unmodeled second data to the second client system.

2. A system according to claim 1, the one or more processing units to execute program code to cause the system to receive a request for the unmodeled second data from the second client system and, in response to the request, to retrieve the unmodeled second data from the first client system based on the information, to generate the visualization of the unmodeled second data based on the information and to transmit the visualization to the second client system.

3. A system according to claim 1, wherein the information comprises a controller file and a view file, the controller file including information for retrieving the other data from the first client system and the view file including information for generating a visualization based on the other data.

4. A system according to claim 2, wherein retrieval of the unmodeled second data from the first client system based on the information comprises requesting of the unmodeled second data from a content integrator of the first client system.

5. A system according to claim 2, the one or more processing units to execute program code to cause the system to:
   receive, from a third client system, third instance data of the first data structure defined by the metadata;
   store the third instance data in the storage system;
   receive a request for the third instance data from the second client system; and
   in response to the request, transmit the stored third instance data to the second client system.

6. A system according to claim 1, the one or more processing units to execute program code to cause the system to:
receive a request for the first instance data from a second client system; and
in response to the request, identify the stored indication associating the first instance data, the second client system, and the unmodeled second data, retrieve the unmodeled second data from the first client system based on the information, generate the visualization of the unmodeled second data based on the information, and transmit a visualization of the stored first instance data and the visualization of the unmodeled second data to the second client system.

7. A system according to claim 6, wherein retrieval of the unmodeled second data from the first client system based on the information comprises requesting of the unmodeled second data from a content integrator of the first client system.

8. A computer-implemented method executed by a computer system storing metadata defining a plurality of data structures, the method comprising:
receiving, from a first client system, first instance data of a first data structure defined by the stored metadata, the first instance data associated with a first entity;
storing the first instance data of the first data structure in a data store;
receiving, from the first client system, an indication associating the first instance data and a second client system with an identification of an existence of unmodeled second data without including the unmodeled second data, wherein the second client system is authorized to access the unmodeled second data based on the indication, and wherein the unmodeled second data is associated with the first instance data but is not defined by the metadata that defines the first data structure, wherein the identification of the existence of the unmodeled second data in the indication is distinct from the unmodeled second data;
storing the indication in the data store;
receiving, from the first client system, information for retrieving the unmodeled second data from the first client system and for generating a visualization based on the unmodeled second data;
receiving a request for data associated with the first entity from a second client system; and
in response to the request, identifying the stored indication associating the first instance data, the second client system, and the unmodeled second data, retrieving the unmodeled second data from the first client system based on the information, generating the visualization of the unmodeled second data for presentation of the information, and transmitting a visualization of the stored first instance data and the visualization of the unmodeled second data to the second client system.

9. A method according to claim 8, wherein the information comprises a controller file and a view file, the controller file including information for retrieving the other data from the first client system and the view file including information for generating a visualization based on the other data.

10. A method according to claim 8, wherein retrieval of the unmodeled second data from the first client system based on the information comprises requesting of the unmodeled second data from a content integrator of the first client system.

11. A method according to claim 8, further comprising:
receiving, from a third client system, third instance data of the first data structure defined by the metadata;
storing the third instance data in the storage system;
receiving a request for data associated with the third client system from the second client system; and
in response to the request, transmitting the stored third instance data to the second client system.

12. A method according to claim 8, further comprising:
receiving a request for data associated with the first client system from a third client system;
in response to the request, determining that the third client system is not associated with the first instance data and the unmodeled second data; and
in response to the determination, transmitting a visualization of the stored first instance data to the second client system.

13. A non-transitory computer-readable medium storing processor-executable process steps which, when executed by one or more processors, cause a computer system to:
receive, from a first client system, first instance data of a first data structure defined by the stored metadata, the first instance data associated with a first entity;
store the first instance data of the first data structure in a data store;
receive, from the first client system, an indication associating the first instance data and a second client system with an identification of an existence of unmodeled second data without including the unmodeled second data, wherein the second client system is authorized to access the unmodeled second data based on the indication, and wherein the unmodeled second data is associated with the first instance data but is not defined by the metadata that defines the first data structure, wherein the identification of the existence of the unmodeled second data in the indication is distinct from the unmodeled second data;
store the indication in the data store;
receive, from the first client system, information for retrieving the unmodeled second data from the first client system and for generating a visualization based on the unmodeled second data;
receive a request for data associated with the first entity from a second client system; and
in response to the request, identify the stored indication associating the first instance data, the second client system, and the unmodeled second data, retrieve the unmodeled second data from the first client system based on the information, generate the visualization of the unmodeled second data for presentation of the information, and transmit a visualization of the stored first instance data and the visualization of the unmodeled second data to the second client system.

14. A medium according to claim 13, wherein the information comprises a controller file and a view file, the controller file including information for retrieving the other data from the first client system and the view file including information for generating a visualization based on the other data.

15. A medium according to claim 14, wherein retrieval of the unmodeled second data from the first client system based on the information comprises requesting of the unmodeled second data from a content integrator of the first client system.

16. A medium according to claim 13, the processor-executable process steps further executable by one or more processors to cause a computer system to:

receive, from a third client system, third instance data of the first data structure defined by the metadata;

store the third instance data in the storage system;

receive a request for data associated with the third client system from the second client system; and in response to the request, transmit the stored third instance data to the second client system.

17. A medium according to claim 13, the processor-executable process steps further executable by one or more processors to cause a computer system to:

receive a request for data associated with the first client system from a third client system;

in response to the request, determine that the third client system is not associated with the first instance data and the unmodeled second data; and in response to the determination, transmit a visualization of the stored first instance data to the second client system.

18. A medium according to claim 13, wherein retrieval of the unmodeled second data from the first client system based on the information comprises requesting of the unmodeled second data from a content integrator of the first client system.

19. A system according to claim 1, wherein the information for retrieving the unmodeled second data from the first client system is received in a controller file and includes instructions for the direct access of the unmodeled second data from the first client system; and wherein the information for generating the visualization is received in a view file and includes formatting information to format the unmodeled second data for presentation to the authorized second client system.

* * * * *